United States Patent [19]

Barmore

[11] 4,242,932
[45] Jan. 6, 1981

[54] FASTENING DEVICE

[76] Inventor: Thomas C. Barmore, 4 N. 127 Verrill, Addison, Ill. 60101

[21] Appl. No.: 24,711

[22] Filed: Mar. 28, 1979

Related U.S. Application Data

[63] Continuation of Ser. No. 861,349, Dec. 16, 1977, abandoned.

[51] Int. Cl.³ .................. B25B 13/48; F16B 23/00
[52] U.S. Cl. ...................... 81/437; 81/121 R; 81/438; 411/403; 411/410; 411/427
[58] Field of Search .............. 81/71, 90 C, 121 R; 85/9 R, 32 R, 45

[56] References Cited

U.S. PATENT DOCUMENTS

| | | | |
|---|---|---|---|
| 2,643,566 | 6/1953 | Santos et al. | 81/71 |
| 3,283,638 | 11/1966 | Ansingh | 85/9 R |
| 3,456,548 | 7/1969 | Schmidt et al. | 85/9 R |
| 3,463,209 | 8/1969 | Podolsky | 81/71 X |
| 3,874,258 | 4/1975 | Semola et al. | 81/71 X |
| 3,878,740 | 4/1975 | Gutshall | 81/121 R |

FOREIGN PATENT DOCUMENTS 110624  4/1964  Czechoslovakia ........................ 81/71

Primary Examiner—James G. Smith
Attorney, Agent, or Firm—Carl C. Batz

[57] ABSTRACT

A fastening device including a bolt, screw or nut and a socket wrench therefor, each of the bolt, screw or nut and also the socket having polygonal surfaces one of which is greater in size and one of which is lesser in size, the greater such surface of the socket matching the greater surface of the bolt, screw or nut and the lesser such surface of the socket matching the lesser surface of the bolt, screw or nut.

One feature is the provision of an auxiliary member which fits into the socket of the standard socket wrench, the auxiliary member providing the lesser polygonal surface for such socket.

Another feature is the use of a round body or head having such greater or lesser polygonal surfaces.

Yet another feature is the provision of a bolt, screw or nut and a corresponding socket each of which has three such polygonal surfaces one of which is the greatest, the second of which is lesser than said greater surface, and the third of which is lesser than said second polygonal surface whereby to provide a three-way drive to tighten or loosen the bolt, screw or nut.

Still another feature is the provision of polygonal surfaces of different sizes in the socket which correspond with such surfaces on the bolt, screw or nut and which upon the application of torque to the socket tighten the engagement between the polygonal surfaces of the socket with the polygonal surfaces of the bolt, screw or nut.

3 Claims, 6 Drawing Figures

U.S. Patent  Jan. 6, 1981  4,242,932
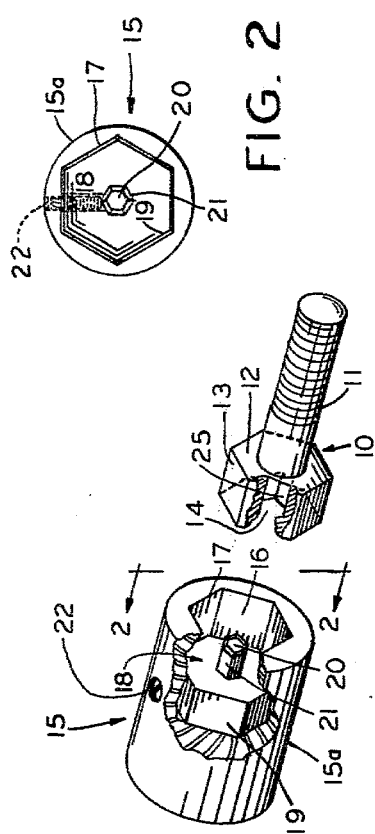
FIG. 1
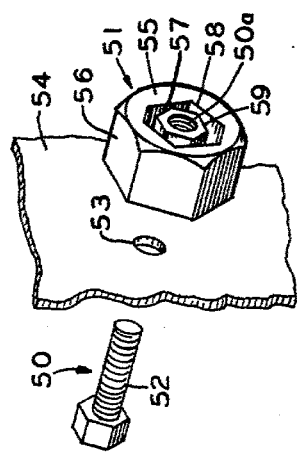
FIG. 2
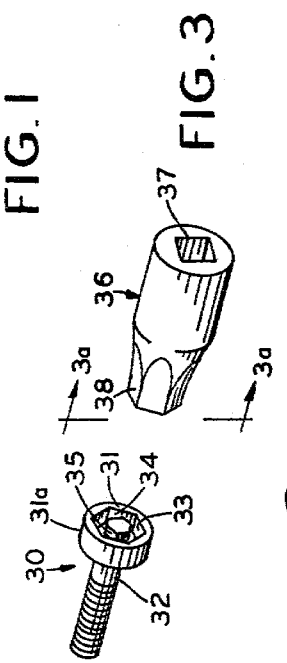
FIG. 3
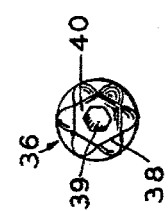
FIG. 3a
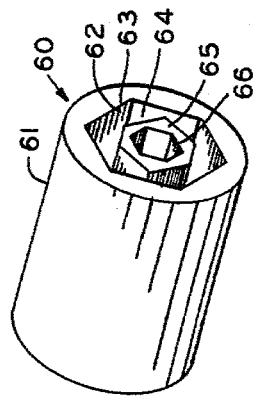
FIG. 4
FIG. 5

FASTENING DEVICE

This is a continuation of application Ser. No. 861,349, filed Dec. 16, 1977, now abandoned.

This invention relates to a fastening device which includes a bolt, screw or nut which maybe called a threaded element, and driving means for turning this element to tighten or loosen the same.

BACKGROUND OF THE INVENTION

Bolts, screws and nuts are commonly turned angularly about their axes to thereby cause the threads to move them in an axial direction to thereby perform their fastening function. The nuts, bolts and screws are driven in some way to tighten or loosen them with respect to the material being fastened. These nuts, bolts or screws may be polygonal in shape on their outsides, having, for example, four, six or eight sides, and may be turned with a wrench or may have grooves across their tops so as to be turned by a screwdriver. A single groove may be diametrically placed on the top of the bolt or screw, or cross grooves may be used each intersecting the axis of the bolt or screw and these cross grooves require a Phillips type screwdriver.

Each of the types of turning means above mentioned tend to loosen their grip on the body of the bolt or screw as they are turned; and when substantial torque is applied, the wrench is likely to move across the corners of the bolt, or the screwdriver may pop out of the groove.

What is needed is some way to turn the bolt, screw or nut which, as more torque is applied, the engagement between the tool and the bolt or screw becomes tighter and the engagement is even more secure. Further, it would be desirable to be able to accomplish such a result while using the standard socket wrench which is commonly available.

Therefore, I have set myself to discover a fastening device which meets these needs and desires.

DESCRIPTION OF THE INVENTION

Certain embodiments of this invention are illustrated in the accompanying drawing in which FIG. 1 is a perspective view of a bolt and a socket with parts broken away to show the interior thereof;

FIG. 2 is a view of one end of a cylindrical socket as modified in accordance with my invention the view being taken as seen from line 2—2 of FIG. 1;

FIG. 3 is a perspective view of a bolt and a drive member in accordance with another modification of my invention;

FIG. 3a is a view of the end of the socket 36 taken as seen from line 3a in FIG. 3;

FIG. 4 is a perspective view of a nut and bolt member in accordance with still another form of the invention; and FIG. 5 is a perspective view of another modification of the invention showing a cylindrical socket.

According to the modification of FIGS. 1 and 2 of the drawing, the device includes a bolt 10 which has a threaded shank 11 and a body 12. The body 12 has an outer surface 13 which has six sides in the form of a hexagon. This outer surface may be described as polygonal having three or more planar sides and three or more angles between the sides. The embodiments illustrated have six sides but may have four, six or other numbers of sides. Preferably the polygonal surfaces have equal sides and equal angles. The body has a cavity 14 extending axially from its end opposite the shank and the walls of this cavity have a surface 25 in the form of a polygon.

Also shown in FIG. 1 is a socket 15 which may be the socket of the standard socket wrench. As in the common socket wrench, the socket has a cylindrical exterior 15a and a cavity 16 which extends axially inward from its end, and the walls of cavity 16 provide a polygonal surface 17 having the same number of sides as the body of bolt 10, the cavity 16 being of a size and shape as to be movable axially to receive the body of bolt 10 with the polygonal surface 17 of cavity 16 engaged about the polygonal surface 13 on the outside of the bolt body 12.

Inside the cavity 16 is an auxiliary drive member 18 having a polygonal surface 19 on its outside so that the surface 19 is engaged by surface 17 which prevents member 18 from turning with respect to socket 15. Member 18 has the axial extension 20 also having a polygonal surface 21. The corners of the polygonal surface 21 are offset with respect to the polygonal surface 17 of the socket preferably with the corners of surface 21 at the angular mid-point between the corners of the surface 17, and the corners of the polygonal surface 25 are offset with respect to the corners of the polygonal surface 13, preferably with the corners of surface 25 at the angular mid-point between the corners of surface 13.

FIG. 3 shows another modification in which bolt 30 has a cylindrical outer surface 31a and a threaded shank 32. Body 31 has the angular cavity 33 which has the polygonal outside surface 34 and the polygonal inside surface 35. The corners of surface 35 are offset with respect to the corners of surface 34 and preferably the corners of surface 35 are at the angular mid-point between the corners of surface 34.

FIG. 3 shows also the socket 36 which at one end has the polygonal cavity 37 into which a wrench handle may be inserted. At its other end, socket 36 is formed to have a polygonal exterior surface 38. This end of the socket 36 also has a cavity 39 extending axially inward of the socket which provides on its outside wall a polygonal surface 40. When the socket 36 is moved axially toward bolt 30, the end of the socket enters the cavity 33, the surface 38 of the socket engages surface 34 and the surface 40 engages the surface 35 of the bolt 30. The corners of surface 34 of the bolt are offset with respect to the corners of surface 35, preferably the corners of surface 34 being at the angular mid-point between the corners of surface 35. Similarly the corners of the surface 38 of the socket are at the angular mid-points between the corners of surface 40.

If desired, the cylindrical portion of socket 36 could be formed with a polygonal surface instead of the cylindrical surface shown in FIG. 3. Such polygonal surface could be of a size to fit the standard socket of a socket wrench set so that the member 36 could be inserted into the standard socket.

FIG. 4 shows still another modification which includes the bolt 50 and a nut 51. The bolt may have its shank 52 extending through hole 53 in the material 54 with nut 51 engaging threads of the bolt shank. In this modification, the nut instead of the bolt has special structure.

The body 55 of nut 51 has a polygonal exterior surface 56 and contains an annular cavity 57, the outside of the cavity providing the polygonal surface 58 and the interior of the cavity providing the inside polygonal surface 59. Inside the surface 59 is the tapped hole through which the shank 52 of the bolt may pass.

Again, the corners of the surface 59 are offset with respect to the corners of the surface 58, preferably with the corners of surface 59 being at the angular mid-point between the corners of surface 58. Additionally, in this embodiment, the corners of the surface 59 are angularly offset with respect to the corners of the surface 56, preferably with the corners of the surface 59 being at the angular mid-point between the corners of the surface 56. It is obvious the structure of the nut 51, except for the tapped hole in the center, may be the structure of the body of a bolt or screw.

FIG. 5 shows the socket of a wrench which may be used in connection with the bolt, screw or nut having the structure of the nut shown in FIG. 4. In FIG. 5 the socket 60 has a cylindrical exterior surface 61. In its end is the outer annular cavity 62 providing the outer polygonal surface 63 and the inner polygonal surface 64. Within cavity 62 is a second cavity 65, the outer wall of which provides the polygonal surface 66.

Socket 60 may move axially into engagement with the nut 51 or with the bolt or screw having similar structure with a surface of the socket 63 engaging surface 56 of the nut, the surface 64 of the socket engaging surface 58 of the nut and the surface 66 of the socket engaging the surface 58 of the nut.

According to the principle previously explained, the corners of the surface 63 of the socket are angularly offset with respect to the corners of the surface 64 preferably with the corners of the surface 63 at the angular mid-points between the corners of surface 64; and the corners of the surface 64 are angularly offset with respect to the corners of surface 66, preferably with the corners of surface 64 at the angular mid-point between the corners of surface 66.

OPERATION

Referring first to the modification of FIGS. 1 and 2 and assuming that the bolt 10 is to be turned into a tapped hole, the bolt is started into the hole, and the operator selects a socket which has an end cavity just large enough to fit over the body of the bolt 10. The selection may be made from an ordinary set of sockets having the same number of faces as does the bolt. Then the auxiliary member 18 having this same number of sides is slid into the socket with the extension 18 pointing outwardly. If the socket is to be used for several bolts which are the same as bolt 10, the operator may turn the set screw 22 to hold the auxiliary member in place. Then the operator moves the socket axially to bring the surface 17 into engagement with the surface 13 of the bolt.

The surface 21 of the auxiliary member comes into engagement with the surface 25 of the bolt. Then the operator may turn the handle (not shown) which fits into the back end of the socket. The drive which responds to this is through the socket to the surface 13 of the bolt and also through the auxiliary member 18 and surfaces 19 and 21 to surface 35 of the bolt.

When torque is applied there is a component, of course, which turns the bolt angularly about its axis and also a component which presses inwardly against the surface 13 of the bolt and outwardly against the surface 25 of the bolt. To some degree at least these inwardly and outwardly directed components balance. The result is a tight grip between the socket and the bolt body. This grip is improved when the corners of the surface 25 are angularly offset and between the corners of the surface 13 and the corners of the surface 17 is angularly offset and between the corners of the surface 21, and the ideal condition is to have the corners of one surface of each pair of surfaces about the mid-point between the corners of the other pair of surfaces.

In each modification described there is a bolt, screw or nut having a greater polygonal surface and a lesser polygonal surface which are matched by corresponding polygonal surfaces in the socket. In each case the drive to turn the bolt, screw or nut is both through the greater polygonal surface and the lesser polygonal surface.

The modification of FIG. 1 is especially useful in that by removing the auxiliary member 18 the device then may be used for turning the common bolt having no cavity in its body portion.

The modification of FIG. 2 is especially good in that it permits a round bodied bolt or screw which is many times desirable, and the modification of FIG. 4 or 5 is especially desirable in that it provides a three-way drive. One way is through the socket polygonal surface 63, another is through the polygonal surface 64, and still another is through the polygonal surface 66. The surface 63 is greater in size and the surface 64 is lesser in size but with respect to the surface 66 the surface 64 is greater in size and the surface 66 is lesser.

In the device as shown in FIGS. 1 and 2 the extension 20 of drive member 18 may contain an axial cavity such as cavity 39 of FIG. 3. In this case the adjusting screw could be used to set the auxiliary member 18 so that the extension 20 extends beyond the end of the socket 15 and in this position the tool could be used with socket 15 to tighten or loosen a bolt such as the bolt 30 shown in FIG. 3.

While I have illustrated and described in detail only a few embodiments of my invention, it will be apparent to those skilled in this art that other modifications may be constructed and many changes may be made, all within the spirit of the invention and the scope of the appended claims.

What is claimed:

1. A fastening device comprising a bolt having a threaded shank and a body, said body having a polygonal outer surface, said body having also an axial cavity in its end, said bolt having a polygonal surface at the side boundry of its cavity, a socket having an axial cavity extending inwardly from its end, said socket having a polygonal surface at said side boundary of its cavity, and an auxiliary drive member having an outer polygonal surface and being axially moveable into the cavity of said socket with its outer polygonal surface in engagement with said polygonal surface of said socket, said auxiliary member having an axial extension therefrom which is provided with an outer polygonal surface, said socket being axially moveable with said auxiliary member contained within its cavity, into engagement with said bolt, to bring its polygonal surface at the boundary of its cavity into engagement with said outer polygonal surface of the body of said bolt and to bring the polygonal surface of said extension into engagement with said polygonal surface at the side boundary of said cavity in said bolt body, whereby turning of said socket causes the application of torque directly from said socket to said bolt and also indirectly through said auxiliary member to said bolt.

2. A fastening device as set forth in claim 1 including screw means for securing said auxiliary member to said socket after said auxiliary member has been moved axially into position within the cavity of said socket.

3. A fastening device as set forth in claim 1 in which said polygonal surfaces are hexagonal.

* * * * *